US011113194B2

(12) United States Patent
Dastidar et al.

(10) Patent No.: US 11,113,194 B2
(45) Date of Patent: Sep. 7, 2021

(54) PRODUCER-TO-CONSUMER ACTIVE DIRECT CACHE TRANSFERS

(71) Applicant: XILINX, INC., San Jose, CA (US)

(72) Inventors: Jaideep Dastidar, San Jose, CA (US); Millind Mittal, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 10 days.

(21) Appl. No.: 16/560,217

(22) Filed: Sep. 4, 2019

(65) Prior Publication Data

US 2021/0064529 A1    Mar. 4, 2021

(51) Int. Cl.
*G06F 12/0811*    (2016.01)
*G06F 12/0804*    (2016.01)
*G06F 12/121*    (2016.01)

(52) U.S. Cl.
CPC ...... *G06F 12/0811* (2013.01); *G06F 12/0804* (2013.01); *G06F 12/121* (2013.01); *G06F 2212/1044* (2013.01); *G06F 2212/608* (2013.01)

(58) Field of Classification Search
CPC ............. G06F 12/0811; G06F 12/0804; G06F 12/121; G06F 2212/1044; G06F 2212/608
USPC ....................................................... 711/119
See application file for complete search history.

(56) References Cited

U.S. PATENT DOCUMENTS

| | | | |
|---|---|---|---|
| 6,608,813 B1 | 8/2003 | Chiussi et al. | |
| 6,914,907 B1 | 7/2005 | Bhardwaj et al. | |
| 8,422,493 B2 | 4/2013 | Kono et al. | |
| 8,787,374 B2 | 7/2014 | Maeda et al. | |
| 9,306,845 B2 | 4/2016 | Kumagai et al. | |
| 9,336,142 B2 | 5/2016 | Ghai et al. | |
| 9,391,835 B2 | 7/2016 | Aoshima et al. | |
| 9,525,591 B2 | 12/2016 | Yasuda et al. | |
| 9,794,194 B2 | 10/2017 | Yasuda et al. | |
| 10,097,466 B2 | 10/2018 | Tang et al. | |
| 2006/0123156 A1* | 6/2006 | Moir ....................... | G06F 9/526 710/33 |

(Continued)

FOREIGN PATENT DOCUMENTS

JP    2014160502 A    9/2014

OTHER PUBLICATIONS

U.S. Appl. No. 15/967,473, filed Apr. 30, 2018, Entitled: "Circuit for and Method of Providing a Programmable Connector of an Integrated Circuit Device", San Jose, CA USA.
U.S. Appl. No. 16/024,500, filed Jun. 29, 2018, Entitled: "Transparent Port Aggregation in Multi-Chip Transport Protocols", San Jose, CA USA.
U.S. Appl. No. 16/025,762, filed Jul. 2, 2018, Entitled: "Logical Transport Overlayed Over a Physical Transport Having a Tree Topology", San Jose, CA USA.

(Continued)

*Primary Examiner* — Gautam Sain
(74) *Attorney, Agent, or Firm* — Patterson + Sheridan, LLP (57) ABSTRACT

The embodiments herein creates DCT mechanisms that initiate a DCT at the time the updated data is being evicted from the producer cache. These DCT mechanisms are applied when the producer is replacing the updated contents in its cache because the producer has either moved on to working on a different data set (e.g., a different task) or moved on to working on a different function, or when the producer-consumer task manager (e.g., a management unit) enforces software coherency by sending Cache Maintenance Operations (CMO). One advantage of the DCT mechanism is that because the direct cache transfer takes place at the time the updated data is being evicted, by the time the consumer begins its task, the updated contents have already been placed in its own cache or another cache within the cache hierarchy.

20 Claims, 7 Drawing Sheets

(56) References Cited

U.S. PATENT DOCUMENTS

| | | | |
|---|---|---|---|
| 2007/0079298 A1* | 4/2007 | Tian | G06F 8/45 |
| | | | 717/140 |
| 2015/0127910 A1* | 5/2015 | Ghai | G06F 12/0804 |
| | | | 711/122 |
| 2018/0287964 A1 | 10/2018 | Gray | |
| 2018/0293169 A1* | 10/2018 | Beard | G06F 11/1064 |
| 2019/0004958 A1* | 1/2019 | Vasudevan | G06F 3/065 |
| 2019/0102295 A1 | 4/2019 | Sury et al. | |
| 2019/0102303 A1 | 4/2019 | Wang et al. | |
| 2019/0340147 A1* | 11/2019 | Jalal | G06F 12/0831 |

OTHER PUBLICATIONS

U.S. Appl. No. 16/053,384, filed Aug. 2, 2018, Entitled: "Logical Transport Over a Fixed PCIE Physical Transport Network", San Jose, CA USA.

U.S. Appl. No. 16/141,704, filed Sep. 25, 2018, Entitled: "Scalable Coherence Management Independent of Transport Protocol", San Jose, CA USA.

U.S. Appl. No. 16/053,488, filed Aug. 2, 2018, Entitled: "Hybrid Precise and Imprecise Cache Snoop Filtering", San Jose, CA USA.

U.S. Appl. No. 16/208,260, filed Dec. 3, 2018, Entitled: "Scratchpad Memory Management in a Computing System", San Jose, CA USA.

\* cited by examiner

PRODUCER-TO-CONSUMER ACTIVE DIRECT CACHE TRANSFERS

TECHNICAL FIELD

Examples of the present disclosure generally relate to performing direct cache transfers in a heterogeneous processing environment.

BACKGROUND

Server CPU-Accelerator systems, such as those enabled by the Compute eXpress Link (CXL), Cache Coherent Interconnect for Accelerators (CCIX), QuickPath Interconnect/Ultra Path Interconnect (QPI/UPI), Infinity Fabric, NVLink™, and Open Coherent Accelerator Processor Interface (OpenCAPI) connected SoCs are all inherently hardware cache-coherent systems—i.e. the hardware maintains a universal, coherent view of accessed, modified, and cached data regardless of whether the processor or accelerator is acting as the producer or consumer of the data and metadata (information about the data).

Current shared-memory CPU-Accelerator execution frameworks either rely on software coherency or hardware coherency for producer-consumer interactions in those systems. Over time, at least one of the CPU or accelerator acts as a producer or consumer of the data or metadata as part of an application or as part of performing a function. Movement of that data between the caches of the producer-consumer pair can either take place using the explicit actions of software coherency or the implicit actions of hardware coherency.

These CPU-Accelerator systems are also described as Cache-Coherent Non-Uniform Memory Access systems (CC-NUMA). CC-NUMA comes about as a result of the difference in both latency and bandwidth depending on whether the CPU or accelerator accesses are near-memory or far memory, and depending on where the data is cached at the time its accessed by either the producer or consumer. In addition, the producer-consumer pairs and their cached data may be located closer to each other than the data on which they are operating. This may result in the producer-consumer pair having superior latency and bandwidth for interactions with each other compared to their respective individual interactions with the data on which they are operating. In addition, these CPU-Accelerator systems being heterogeneous systems, the capabilities of the CPUs and accelerators may also differ in terms of their operating frequencies and caching capabilities.

SUMMARY

Techniques for performing a direct cache transfer (DCT). One example is a computing system that includes a producer comprising a first processing element configured to generate processed data, a producer cache configured to store the processed data generated by the producer, a consumer comprising a second processing element configured to receive and process the processed data generated by the producer, and a consumer cache configured to store the processed data generated by the consumer. The producer is configured to, in response to receiving a stash cache maintenance operation (stash-CMO), perform a DCT to transfer the processed data from the producer cache to the consumer cache.

Another example herein is a method that includes generating processed data at a producer comprising a first hardware processing element, storing the processed data in a producer cache, performing, in response to receiving a stash-CMO, a DCT to transfer the processed data from the producer cache to a consumer cache, and processing, after the DCT, the processed data at a consumer comprising a second hardware processing element.

DETAILED DESCRIPTION

Direct Cache Transfer (DCT) is a technique for moving data directly between two caches outside of the control of corresponding processing elements (e.g., a CPU or accelerator core). In some embodiments, DCT is a pull model where, when a consumer wants data, the consumer contacts a tracking agent (e.g., a home or a home agent) to locate a copy of the data. The tracking agent then instructs the cache containing the copy to use a DCT to transfer the data to a cache corresponding to the consumer. A pull model works well for homogeneous systems where the processors and memory are the same distance from each other. For example, a first processing element (e.g., a consumer) can request data from the cache of a second processing element currently processing the data (e.g., a producer). Because the producer may constantly be evicting data as it completes the task, the producer evicts data from its cache which means the consumer gets whatever data is left in the cache when the task is complete. But since in a homogenous system the producer and consumer have the same size caches, it does not matter that the producer is evicting entries. That is, the producer may have processed 100 MBs of data but the size of the consumer and producer caches may be only 2 MBs. Thus, even if the producer cache uses DCT multiple times to send more than 2 MBs to the consumer cache, the consumer cache can only store 2 MBs.

However, as mentioned above, in CC-NUMA systems there can be different processing elements with different sized caches. Thus, these systems can take advantage of a smaller, producer cache using multiple DCTs to send data to a larger consumer cache. However, with a pull model, it is often too late to take advantage of a DCT because of the time required before the consumer can initiate the DCT. This is further exacerbated if the consumer is slower than the producer (e.g., has a slower operating frequency).

Instead of using a pull model, the embodiments herein create DCT mechanisms that initiate a DCT at the time the updated data is being evicted from the producer cache. These DCT mechanisms are applied when the producer replaces the updated contents in its cache because the producer has either moved on to working on a different data set (e.g., a different task), moved on to working on a different function, or when the producer-consumer task manager enforced software coherency by sending Cache Maintenance Operations (CMO). One advantage of the DCT mechanism is that because the DCT takes place at the time the updated data is being evicted, by the time the consumer accesses the updated data, this data has already been placed in the consumer's cache or another cache within the cache hierarchy. Thus the consumer no longer has to go all the way to main memory, which can be far in a CC-NUMA system, to retrieve the data set.

Figure 1:
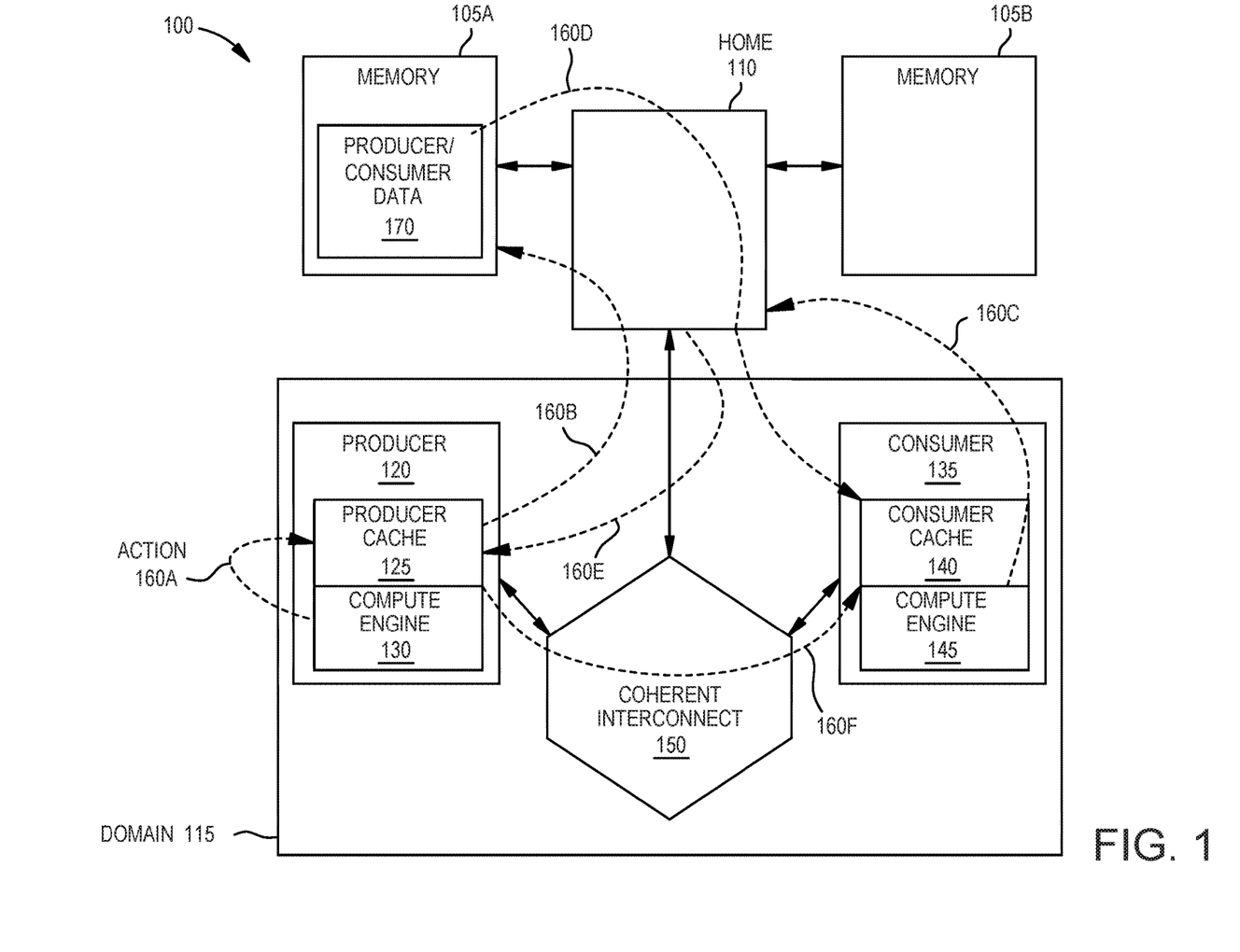
FIG. 1 is a block diagram of a computing system that implements a pull model to perform a direct cache transfer, according to an example.

FIG. 1 is a block diagram of a computing system 100 that implements a pull model to perform a DCT, according to an example. In one embodiment, the computing system 100 is CC-NUMA system that includes different types of hardware processing elements—e.g., a producer 120 and a consumer 135—which may have different types and sizes of caches—e.g., producer cache 125 and consumer cache 140. In this example, the producer 120 and the consumer 135 are located in the same domain 115 and are communicatively coupled via a coherent interconnect 150. However, in other embodiments, the producer 120 and consumer 135 may be in different domains coupled using a plurality of interconnects.

FIG. 1 illustrates a home 110 (e.g., a home agent or home node) which owns the data stored in the producer cache 125, the consumer cache 140, and the data stored in the memory 105A and 105B (also referred to as main memory). As described below, the home 110 can transfer data from the memory 105A (e.g., producer/consumer data 170) to the producer cache 125 and the consumer cache 140 so that respective compute engines 130, 145 can process the data. In this example, the producer 120 first processes the data 170 before the processed data is then processed by the consumer 135. That is, the producer 120 produces data than is then consumed by the consumer 135. As non-limiting examples, the producer 120 and the consumer 135 can represent respective integrated circuits or compute systems. The producer 120 and consumer 135 can be an accelerator, central processing unit (CPU), graphics processing units (GPU), field programmable gate array (FPGA), application specific integrated circuit (ASIC), system on a chip (SoC) and the like. The compute engines 130, 145 can be processing cores or processing elements within the producer 120 and the consumer 135.

Rather than storing the data produced by the producer 120 back into main memory 105A and 1051, the computing system 100 can instead perform a DCT to transfer data from the producer cache 125 directly to the consumer cache 140. FIG. 1 illustrates a plurality of actions 160 to perform the DCT using a pull model which relies on the consumer 135 to initiate the DCT process. During the action 160A, the compute engines 130 of the producer 120 processes a data set that is part of a task (e.g., search task, machine learning task, compression/decompression task, encryption/decrypton task, etc.). For the subset of the data set that can be held in the producer cache 125, the updated (or processed) data can stay in the producer cache 125. That is, this example assumes that the producer cache 125 is not sufficiently large to store the entire data set of the task.

During action 160B, the subset of the data set that cannot be held in the producer cache 125 is evicted to the main memory 105A and is stored as the producer/consumer data 170. For example, processing the entire data set for the task may result in 100 MB but the producer cache 125 can store only 2 MB.

During action 160C, the compute engine 145 of the consumer 135, upon detecting that the producer 120 has completed its task (which may be done using a flag or metadata sent by the producer 120) retrieves the processed data by first sending a retrieval request to the home 110 (i.e., the location of coherency management) of the data set. For the subset of the data set that is still in the producer cache 125, this data can remain in the cache 125.

During action 160D, the subset of the data set that is not still in the producer cache 125 (i.e., the data 170 stored in the memory 105A) is sent to the consumer 135 from the memory 105A.

During action 160E, the home 110 transmits a DCT snoop informing the producer 120 that the subset of the data set for the task still stored in the producer cache 125 should be sent directly to the consumer 135. During action 160F, the producer 120 performs a DCT to directly transfer any data related to the task from the producer cache 125 to the consumer cache 140.

However, there are several disadvantages of using the pull model to perform DCT. For the case where the producer-consumer interactions rely on software coherency, the software coherency mechanism inherently negates the benefit of a DCT that is initiated by the consumer 135. This is because software coherency typically involves, before the producer 120 indicates the completion of the task (using metadata or setting of a task completion flag) either requiring that the producer 120 flush all updated contents of its cache to memory 105 or requiring that a separate processing unit (e.g., a producer-consumer task manager which can be CPU or accelerator), enforces software coherency by sending CMOs whose execution in effect achieves the flushing of all updated contents in any cache to memory 105. The disadvantage is that by the time the consumer 135 initiates the DCT, there is no opportunity to transfer data between the producer and consumer caches since the data has already been flushed from the producer cache 125 and any other cache (such as a last-level cache).

For the case where the producer-consumer interactions rely on hardware coherency, the producer 120, following the communication of completion in metadata or following the setting of the task completion flag, typically moves on to the next data set (e.g., the next task) or to perform a different function on a different data set. These subsequent producer actions can result in cache capacity conflicts such that the previous updated data set is evicted from the producer cache 125 to make room for the new data set. Here too, there is a similar disadvantage because by the time the consumer 135 accesses the data, either the producer cache 125 or the hierarchical caching system between the producer 120 and the memory 105 have already replaced the updated data set with the new working data set. Again, there is no opportunity for DCTs. The ideal transfer overlap window between when the producer 120 evicts its updated cached contents and when the consumer 135 accesses those updated cached contents can be further exacerbated by asymmetry when the producer cache 125 is smaller than the consumer cache 140, or when there is asymmetry in operating speeds—e.g., the compute engine 130 of the producer 120 has a faster operating frequency than the compute engine 145 of the consumer 135.

There are further, system-wide disadvantages with the pull model. For a CC-NUMA system where the producer-consumer pair is in close proximity to each other (e.g., the same domain 115), and are far from the memory 105, the producer-consumer pair have improved bandwidth and latency attributes to each other relative to memory 105. However, the system 100 is able to take advantage of that close proximity with only the small subset of data that is still stored in the producer cache 125. The data-set that had to be transferred to the consumer 135 from memory 105, i.e., the data-set that was evicted from the producer cache 125, had to go to the remote, memory location of the memory 105 to complete the producer-consumer actions. The producer-consumer actions were not only performed at lower performance as a result, but these actions further impeded other producer-consumer actions between other consumer-producer pairs (not illustrated in FIG. 1) to different data sets also homed by the home 110. This can happen frequently in modern multi-processor and multi-accelerator cloud systems where overall compute efficiency is valued. The embodiments below do not rely on the secondary, passive actions of the consumer 135 for initiating the DCT (as done in the pull model) and can increase the amount of data that can take advantage of DCTs between the producer and consumer caches.

Figure 2:
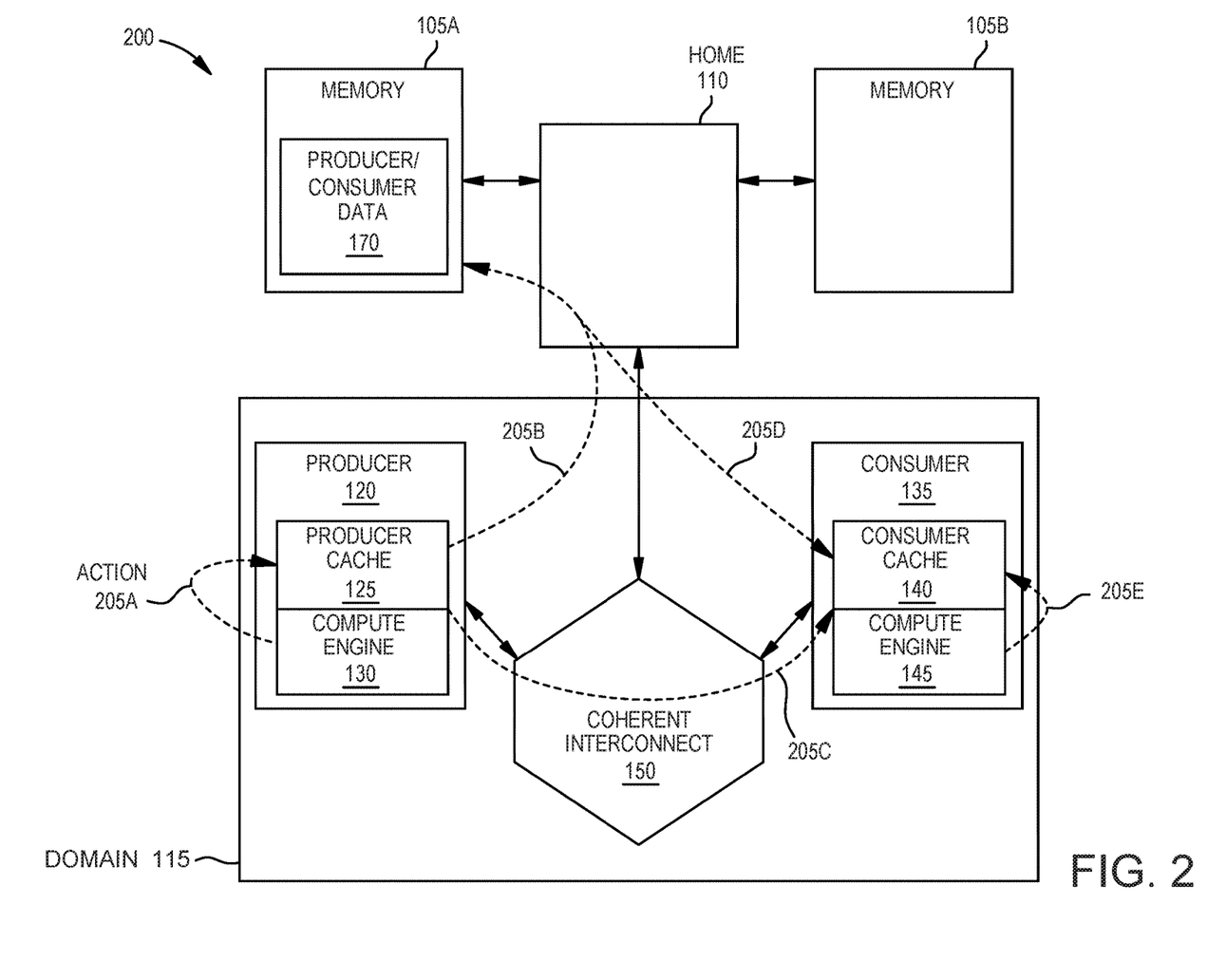
FIG. 2 is a block diagram of a computing system where a producer initiates a direct cache transfer, according to an example.

FIG. 2 is a block diagram of a computing system 200 where a producer initiates a DCT, according to an example. The computing system 200 includes the same hardware components as in the computing system 100 in FIG. 1. In one embodiment, the home 110 and memory 105 are remote from the producer 120 and the consumer 135. Put differently, the home 110 is remote from the domain 115.

FIG. 2 also illustrates multiple actions 205 which are performed during a DCT. For ease of explanation, these actions 205 are discussed in parallel with the blocks of the flowchart in FIG. 3.

Figure 3:
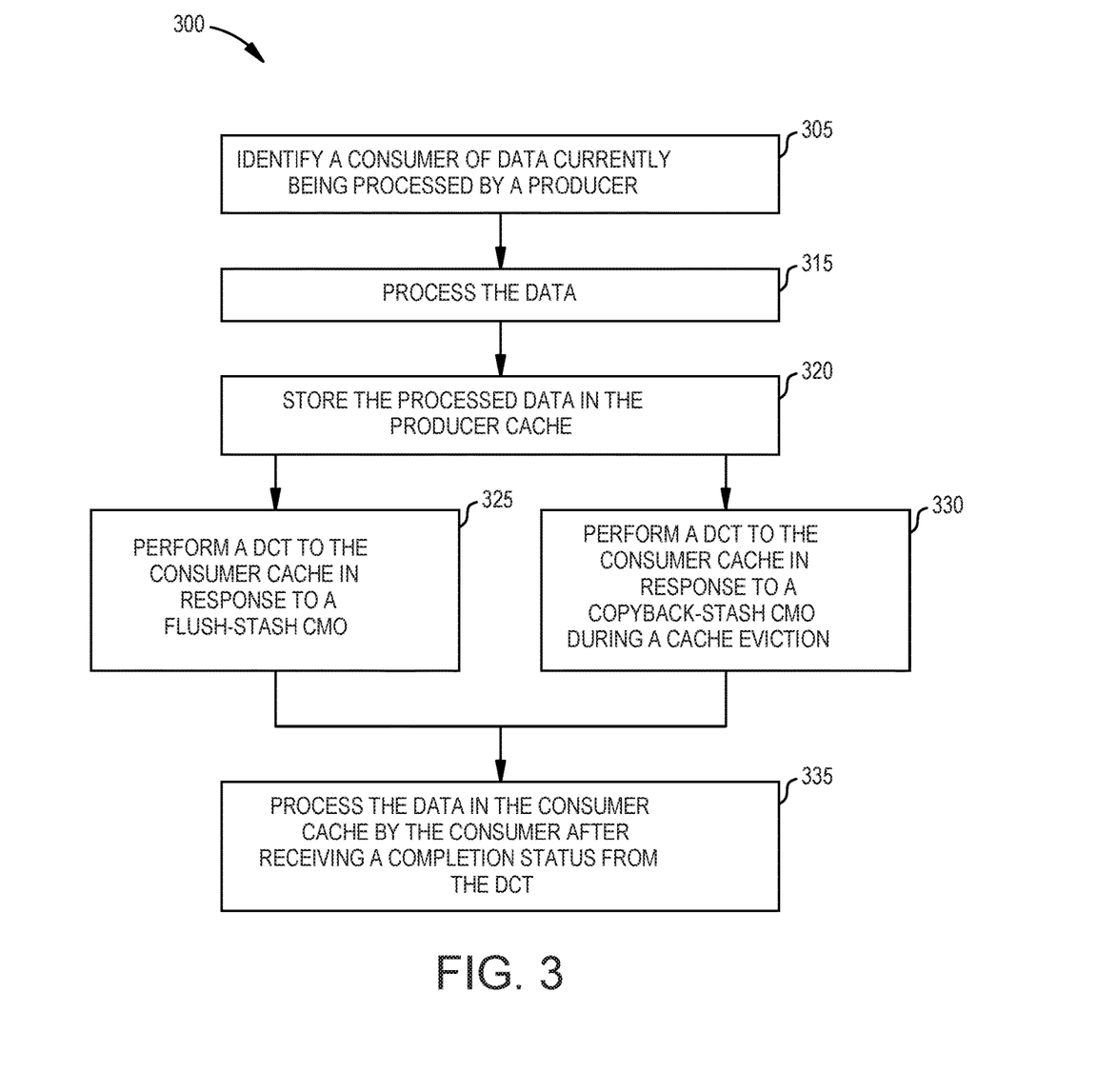
FIG. 3 is a flowchart where the producer initiates a direct cache transfer, according to an example.

FIG. 3 is a flowchart of a method 300 where the producer initiates a DCT, according to an example. In one embodiment, the method 300 is performed when hardware coherency is used to maintain coherency on the data in the system 200. In contrast, using software coherency to maintain data coherency is described in FIGS. 4 and 5 below.

At block 305, the producer 120 identifies a consumer 135 for data currently being processed by the producer 120. For example, when assigning the task to the producer 120, a software application may have told the producer 120 what processing element in the system 200 is the consumer of the data. Thus, the producer 120 knows the destination consumer 135 for the processed data from the beginning (or at least before the producer finishes the task).

At block 315, the producer 120 processes the data set for the task. As mentioned above, the task could be search task, machine learning task, compression/decompression task, encryption/decryption task, etc. When performing the task, the compute engine 130 of the producer 120 generates processed data.

At block 320, the compute engine 230 for the producer 120 stores the processed data in the producer cache 130. This corresponds to the action 205A in FIG. 2.

The method 200 has two alternative paths from block 320. The method can proceed to either block 325 where the producer cache 125 performs a DCT to the consumer cache 140 in response to a flush-stash CMO, or block 330 where the producer cache 125 performs a DCT to the consumer cache 140 in response to a CopyBack-stash CMO during a cache eviction. The flush-stash CMO and the CopyBack-stash CMO are both new CMOs that can be used to initiate DCTs at the producer 120 rather than at the consumer 135. That is, the flush-stash CMO and the CopyBack-stash CMO are new operation codes (op codes) that enable the producer to initiate a DCT transfer to the consumer cache.

At block 325, the compute engine 130 for the producer 120 executes the flush-stash CMO (e.g., one example of a flush type stash-CMO) when the producer 120 plans to update the memory 105 with the latest contents of the data being processed by the producer 120. That is, when updating the memory 105, the compute engine 130 uses the flush-stash CMO to initiate a DCT so that the updated data being transmitted to the memory 105A is also transmitted from the producer cache 125 to the consumer cache 140 via a DCT. As shown by action 205B, the producer cache 125 sends the updated data to the memory 105A. As shown by action 205C, in parallel (or at different times), the producer cache 125 transmits the same updated data to the consumer cache 140.

At block 330, the compute engine 130 of the producer 120 executes the CopyBack-stash CMO (e.g., one example of a copy back type stash-CMO) when the producer cache 125 issues a capacity eviction because processed data for the task is being replaced with a new data-set for the next task or function. Thus, the CopyBack-stash CMO is executed in response to an eviction when the system wants to remove the processed data in the producer cache 125 for a new data set. In this case, the action 205B illustrates data being evicted from the producer cache 125 and being stored up the memory hierarchy in the memory 105A. The action 205C represents the result of performing the CopyBack-stash CMO where the evicted data corresponding to the task is transmitted to the consumer cache 140 using a DCT. The actions 205B and 205C can occur in parallel or at different times.

Regardless of whether block 325 or 330 is used, the consumer 135 can optionally choose to accept or deny the stash operation based on the capacity of the consumer cache 140. Either way, correctness of operation is maintained due to action 205B where the memory has the updated copy.

At block 335, the compute engine 145 in the consumer 135 processes the data in the consumer cache 140 after receiving a completion status as shown by the action 205E in FIG. 2. The consumer 135 can receive completion status information from a variety of different sources. For example, the completion status may have been stored in the cache 140 as part of the DCT, or a separate memory completion flag may be placed in the memory 105A.

For any portion of the data set that was not accepted during the stash operations (either at block 325 or at block 330), the consumer 135 retrieves the updated copy from memory 105 as shown by the action 205D. For the subset of the data set that is held in the consumer cache 140, previously accepted by the stash operation, the consumer 135 benefits from having the updated contents already in the cache 140 thus not only getting a low latency, high bandwidth cache access, but also avoids having to retrieve the data from the lower bandwidth, higher latency memory 105.

While the embodiments above discuss using CMOs to perform producer initiated DCTs between consumers and producers in the same domain, the embodiments are not limited to such. The producer and consumer pairs can be located in different domains. For example, the producer may be in a first expansion box while the consumer is a second expansion box which are connected using one or more switches. The producer may know what domain the consumer is in, but not know which processing element in that domain has been (or will be) selected as the consumer for the data. Instead of sending the processed data from the producer cache directly to the consumer cache in a different domain, in one embodiment, the producer can use the CMOs above to perform a DCT from the producer cache to a cache in the other domain (e.g., a cache in a switch in the second expansion box). Thus, the CMOs can be used to send data to a different domain rather than to a specific consumer cache. Once at the domain, the consumer can retrieve the data. Doing so still avoids retrieving that subset of the data from main memory and avoids using the home 110 as a middle man.

Figure 4:
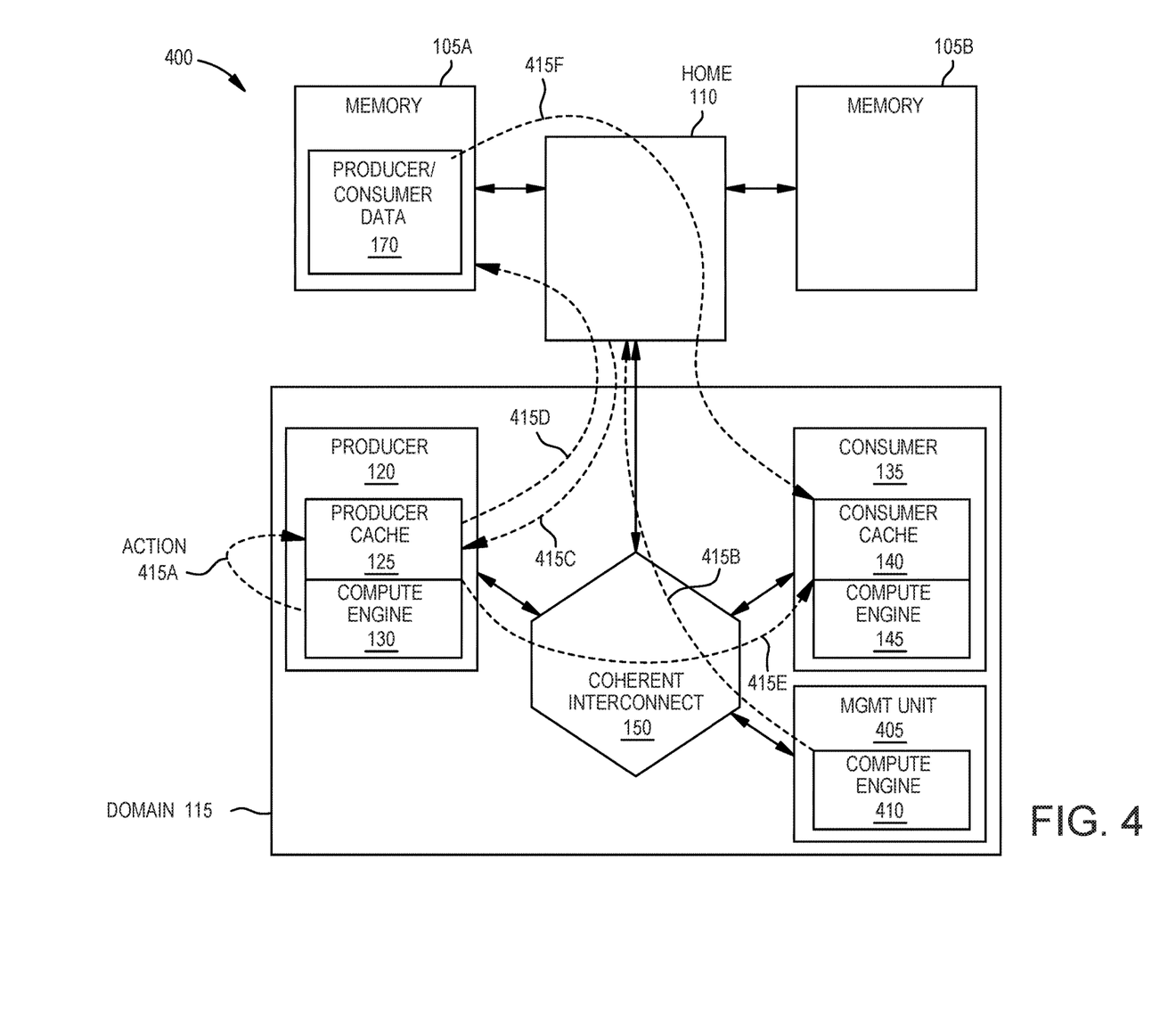
FIG. 4 is a block diagram of a computing system where a coherency manager initiates a direct cache transfer when a producer completes a task, according to an example.

FIG. 4 is a block diagram of a computing system 400 where a coherency manager initiates a DCT when a producer completes a task, according to an example. Unlike in FIG. 2 where coherency is managed by hardware, in FIG. 4, coherency is managed by a software application—i.e., a management unit 405 (Mgmt Unit). Otherwise, FIG. 4 includes the same components as illustrated in FIG. 2. FIG. 4 also includes a plurality of actions 415A-E which are discussed in tandem with the flowchart in FIG. 5.

Figure 5:
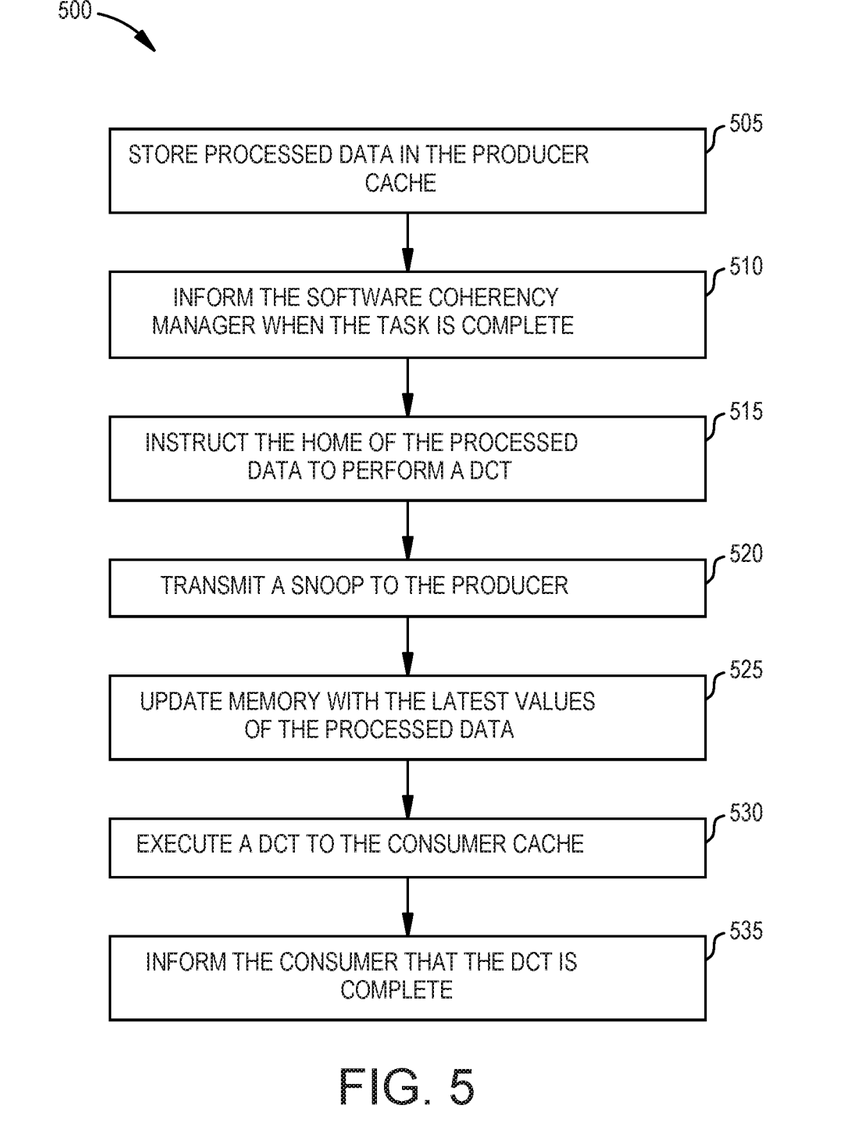
FIG. 5 is a flowchart where a coherency manager initiates a direct cache transfer when a producer completes a task, according to an example.

FIG. 5 is a flowchart of a method 500 where a coherency manager initiates a DCT when a producer completes a task, according to an example. In one embodiment, the coherency manager is a software application that manages coherency in a heterogeneous processing system (e.g., the management unit 405 in FIG. 4).

At block 505, the producer 120 stores processed data for a task in the producer cache 125. This is illustrated by the action 415A in FIG. 4 where the compute engine 130 provides processed data to the producer cache 125. At this point in time, the producer 120 may not know what processing element in the system 400 will be the consumer for the processed data. That is, the management unit 405 (e.g., the software coherency manager) may have not yet selected which processing element will perform the next task on the processed data. For example, the management unit 405 may wait until the producer 120 is finished (or almost finished) before selecting a processing element for the consumer based on the current workloads or idle times of the processing elements.

At block 510, the producer 120 informs the software coherency manager (e.g., the management unit 405) when the task is complete. In one embodiment, after completing the task, the producer 120 sets a flag or updates metadata to inform the management unit 405 of the status. At this point, the management unit 405 selects the consumer 135 to process the data generated by the producer 120 based on, e.g., the current workloads or idle times of the processing elements in the computing system.

At block 515, the management unit instructs the home of the processed data to perform a DCT. In one embodiment, the management unit 405 uses the compute engine 410 (which is separate from the compute engine 130 in the producer 120) to send a stash-CMO to the home 110 as illustrated by action 415B in FIG. 4. The stash-CMO can be a CleanInvalid-Stash CMO and its persistent memory variant, or a CleanShared-Stash CMO and its persistent memory variant. These two CMO-stash are also new CMOs with new corresponding op codes. Note that management unit 405 is a logical unit and is not required to be mutually exclusive with the producer compute engine 130. In some embodiments, the producer compute engine 130 moves on to executing the next producer task, and in other embodiments, the producer compute engine 130 performs the software coherency management actions upon completing its producer tasks.

At block 520, the home 110 transmits a snoop to the producer 120 upon receiving the stash-CMO (e.g., the CleanInvalid-Stash or the CleanShared-Stash). In one embodiment, the home 110 sends a stash-CMO snoop consistent with the original stash-CMO operation transmitted by the management unit 405 to the producer 120. This is illustrated by action 415C in FIG. 4.

At block 525, the producer 120, in response to receiving the stash-CMO from the home 110, updates the memory 105 with the latest values of the processed data stored in the producer cache 125. This is illustrated by the action 415D in FIG. 4.

At block 530, the producer 120, also in response to the received CMO-stash operation, executes a DCT to the consumer cache 140. That is, the producer 120 executes a DCT of the latest values of the data in the producer cache 125 corresponding to the task to the consumer cache 140 which is illustrated by the action 415E in FIG. 4. The consumer 135 can optionally choose to accept or deny the stash operation based on the capacity of the consumer cache 140. Either way, correctness of operation is maintained due to block 535 since the memory 105A has the updated copy of the data.

At block 535, the management unit 405 informs the consumer 135 that the DCT is complete. In one embodiment, the management unit 405 determines when the stash-CMO sequence (and the accompanying DCT) is complete and sets a completion flag which is monitored by the consumer 135. The compute engine of the consumer 135 retrieves the updated copy from consumer cache 140. However, because the producer cache 125 may be unable to store all the processed data for the task, some of the data may have been moved to the memory 105A. As such, the consumer 135 may still need to retrieve a subset of the processed data from the memory 105 which is illustrated by the action 415F. However, for the subset of the data set that is transferred into the consumer cache 140 that was previously accepted by the stash-CMO operation, the consumer 135 benefits from having the updated contents stored in the cache 140 using a low latency, high bandwidth cache access, and avoids retrieving that data from lower bandwidth, higher latency memory 105.

In one embodiment, the software management unit 415 provides a table defining a system address map (SAM) data structure to the hardware executing the Flush, CopyBack, or other CMOs so that the hardware is statically aware of a stash target ID for the CMOs based on the address range those CMOs are being performed on. The stash target ID can also be determined by other means including a target ID derived from an Advanced Programmable Interrupt Controller (APIC) ID, CPU ID, CCIX Agent ID, and then included as part of the stashing DCT CMO.

Some non-limiting advantages of the embodiments above include because the DCT takes place at the time the updated data is being evicted, improved performance is obtained by the consumer of the data. The consumer accessed contents have already been placed in its own cache or another cache within the cache hierarchy. The consumer does not have to go all the way to main memory, which can be far in a CC-NUMA system, to retrieve the data set.

The invention also offers additional performance advantages. For a CC-NUMA system where the producer-consumer pair is in close proximity to each other, and is far from the main memory, the producer-consumer pair has superior bandwidth and latency attributes which are leveraged during DCT up to the capacity of the ability of the consumer cache to hold the data set. Further, the producer-consumer actions did not impede actions performed by other producer-consumer pairs (on a system level) on different data sets also homed by the remote node or home agent. Thus, each producer-consumer pair across the system achieves higher aggregate performance due to the minimized interference due to the embodiments described above.

Figure 6:
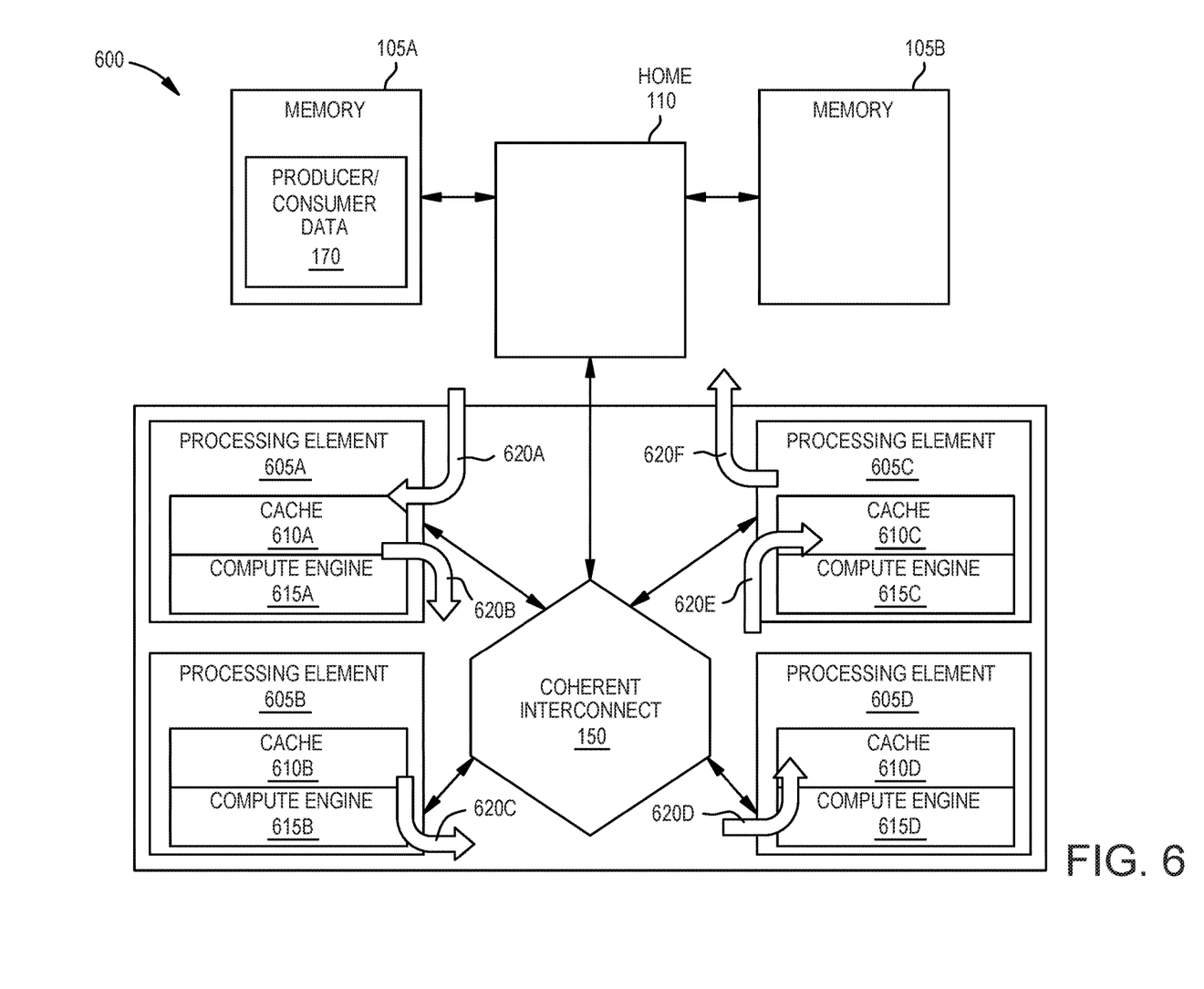
FIG. 6 is a block diagram of computing system that uses direct cache transfers to perform pipelining, according to an example.

FIG. 6 is a block diagram of computing system 600 that uses DCTs to perform pipelining, according to an example. Like in FIGS. 2 and 4, the system 600 includes memory 105 (e.g., main memory) and the home 110 which may be remote from the coherent interconnect 150 and processing elements 605.

The processing elements 605 can be CPUs, accelerators, FPGA, ASIC, systems on a chip (SOC), and the like. The processing elements 605 can be both producers and consumers, That is, the processing elements 605 can consume data processed by another processing element 605 and in turn process the data to produce data that is consumed by another processing element 605.

In FIG. 6, the processing elements 605 are arranged in a daisy chain to perform different sub-task of an overall tasks. For example, the processing elements 605 may be arranged to perform different tasks associated with a security, machine learning, or data compression application.

A pipelined acceleration system can perform efficiently across a daisy-chain of producers/consumers independent of where the memory is homed. FIG. 6 illustrates actions 620A-F where each processing element 605 (except for processing element 605A) acts as a consumer of a data-set that has had an acceleration task performed by another processing element 605 before it acts as a producer. The processing elements 605 also serve as the producer of the next data-set that a consumer receives. Using the CMOs and DCTs discussed above, large amounts of pipelined acceleration data can move from cache 610 to cache 610 using DCTs which leverage the high performance local connections between them, and without resorting to the remote home 110 location where the memory 105 is being hosted.

Figure 7:
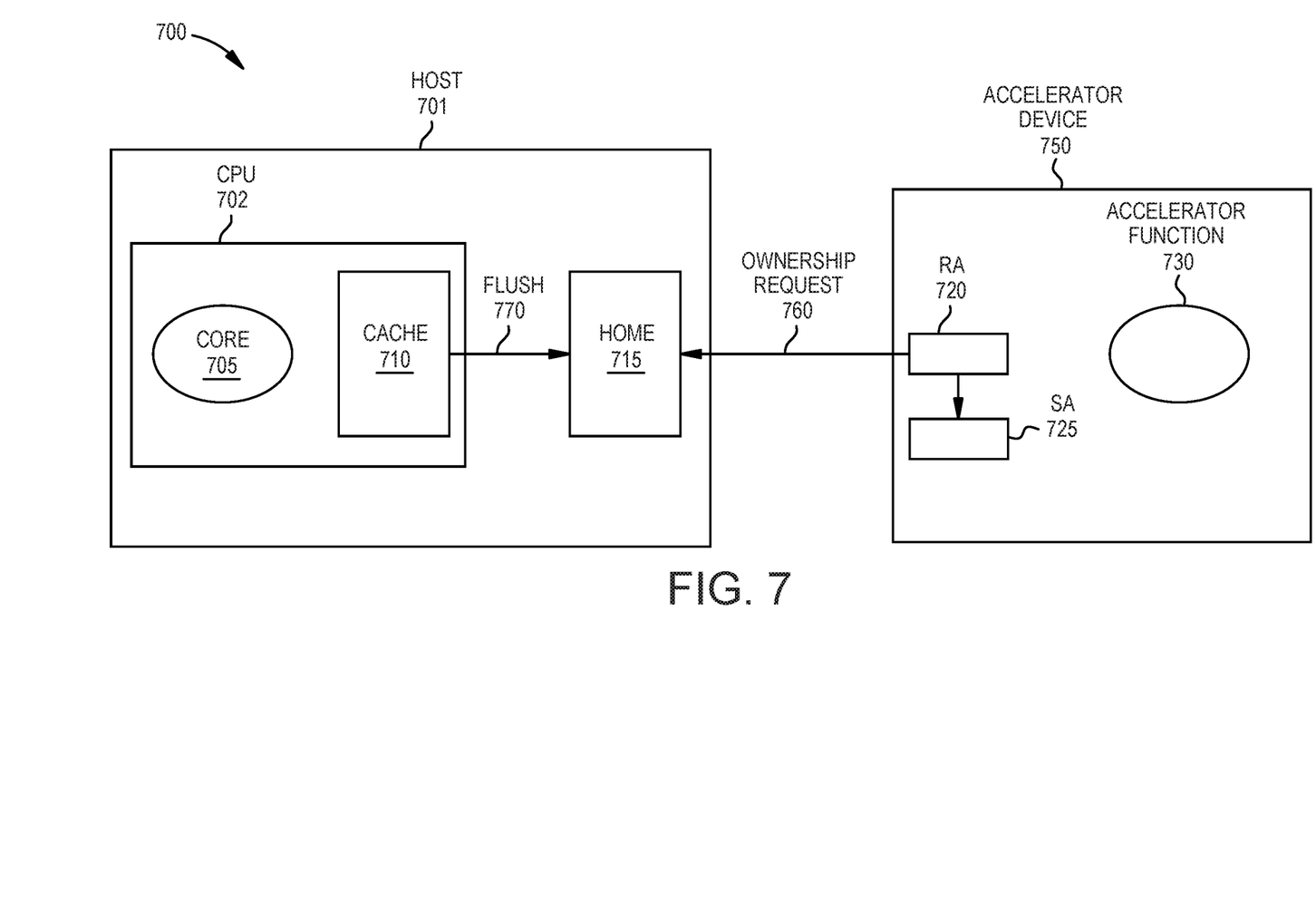
FIG. 7 is a block diagram of a computing system that performs CPU and computational memory interactions, according to an example.

FIG. 7 is a block diagram of a computing system that performs CPU and computational memory interactions, according to an example. While the embodiments above describe using DCTs between consumer-producer pairs that may be two processing elements, similar techniques can be applied to a consumer-producer pair including a CPU 702 (or other processing element) and computational memory in an accelerator device 750. Unlike a traditional I/O model, the memory (not shown) and the processing elements in the accelerator device 750 (e.g., the request agent (RA) 720 and slave agent (SA) 725) are in the same coherent domain as the CPU 702 and its cache 710. As such, the home 715 in the host 701 ensures that the data stored in the host 701 and the accelerator device 750 are stored coherently so that a request for a memory operation, whether originating in the host 701 or the accelerator device 750, receives the most up-to-date version of the data regardless whether that data is stored in memory in the host 701 or the accelerator device 750.

In some applications, the bottleneck when processing data occurs from moving data to the compute unit that processes that data, rather than the time it takes to process that data. Situations where moving the data to the compute engine limits the time required to complete a task is referred to as a computational memory bottleneck. Moving the compute engine closer to the data can help alleviate this issue. Using the embodiments herein, the computational memory bottleneck can be reduced by using the DCTs to transfer data between the CPU and computational memory which reduces the amount of data that is retrieved from main memory.

For example, in FIG. 7, the accelerator device 750 (e.g., a computational memory accelerator) initiates an ownership request 760 that can be performed using a FlushInvalidate-Stash CMO similar to the CMOs discussed above to perform a DCT. Further, the CPU 705 can initiate a flush 770 which can also be performed using the FlushInvalidate-Stash CMO (or Flush-Stash CMO) so that a cache in the accelerator device 750 contains the updated CPU modified contents, which the accelerator device 750 can, subsequently, rapidly perform computational memory actions on.

In the preceding, reference is made to embodiments of the disclosure. However, the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing system, comprising:
   a producer comprising a first processing element configured to generate processed data;
   a producer cache configured to store the processed data generated by the producer;
   a consumer comprising a second processing element configured to receive and process the processed data generated by the producer; and
   a consumer cache configured to store the processed data generated by the consumer,
   wherein the producer is configured to, in response to receiving a stash cache maintenance operation (stash-CMO), perform a direct cache transfer (DCT) to transfer the processed data from the producer cache to the consumer cache.

2. The computing system of claim 1, further comprising:
   at least one coherent interconnect communicatively coupling the producer to the consumer, wherein the computing system is a Cache-Coherent Non-Uniform Memory Access (CC-NUMA) system.

3. The computing system of claim 1, wherein the producer knows a location of the consumer before the producer has completed a task that instructs the producer to generate the processed data.

4. The computing system of claim 1, wherein coherency of the computing system is maintained by hardware elements, wherein the stash-CMO and the DCT are executed in response to the producer determining to update a main memory in the computing system with the processed data currently stored in the producer cache, wherein the stash-CMO is a flush type stash-CMO.

5. The computing system of claim 1, wherein coherency of the computing system is maintained by hardware elements, wherein the stash-CMO and the DCT are executed in response to the producer cache issuing a capacity eviction to remove at least a portion of the processed data, wherein the stash-CMO is a copy back type stash-CMO.

6. The computing system of claim 1, wherein the producer does not know a location of the consumer before the producer has completed a task that instructs the producer to generate the processed data.

7. The computing system of claim 1, wherein coherency of the computing system is maintained by a software management unit, wherein the producer is configured to notify the software management unit when a task that generates the processed data is complete, and wherein the software management unit is configured to instruct a home of the processed data to initiate the DCT.

8. The computing system of claim 7, wherein the software management unit transmits a first stash-CMO to the home to initiate the DCT on the producer.

9. The computing system of claim 8, wherein the home, in response to receiving the first stash-CMO, transmits a snoop comprising the stash-CMO to the producer that instructs the producer to perform the DCT.

10. A method, comprising:
generating processed data at a producer comprising a first hardware processing element;
storing the processed data in a producer cache;
performing, in response to receiving a stash-CMO, a DCT to transfer the processed data from the producer cache to a consumer cache;
processing, after the DCT, the processed data at a consumer comprising a second hardware processing element; and
storing the processed data generated by the consumer in the consumer cache.

11. The method of claim 10, wherein the DCT is performed using at least one coherent interconnect communicatively coupling the producer to the consumer, wherein the producer and the consumer are part of a CC-NUMA system.

12. The method of claim 10, further comprising:
informing the producer of a location of the consumer before the producer has completed a task that instructs the producer to generate the processed data.

13. The method of claim 10, wherein coherency between the consumer and producer is maintained by hardware elements, wherein the stash-CMO and the DCT are executed in response to the producer determining to update a main memory with the processed data currently stored in the producer cache, wherein the stash-CMO is a flush type stash-CMO.

14. The method of claim 10, wherein coherency between the consumer and producer is maintained by hardware elements, wherein the stash-CMO and the DCT are executed in response to the producer cache issuing a capacity eviction to remove at least a portion of the processed data, wherein the stash-CMO is a copy back type stash-CMO.

15. The method of claim 10, wherein the producer does not know a location of the consumer before the producer has completed a task that instructs the producer to generate the processed data.

16. The method of claim 10, wherein coherency between the consumer and producer is maintained by a software management unit, the method further comprising:
notifying the software management unit when a task that generates the processed data is completed by the producer; and
instructing a home of the processed data to initiate the DCT.

17. The method of claim 16, wherein instructing a home of the processed data to initiate the DCT comprises:
transmitting, from the software management unit, a first stash-CMO to the home to initiate the DCT on the producer; and
transmitting, in response to receiving the first stash-CMO, a snoop from the home to the producer, the snoop comprising the stash-CMO that instructs the producer to perform the DCT.

18. The method of claim 17, further comprising:
updating, in response to the snoop, main memory to include the processed data stored in the producer cache.

19. The method of claim 17, further comprising:
informing, after transmitting the snoop, the consumer that the DCT is complete.

20. A computing system, comprising:
a producer comprising a first processing element configured to generate processed data;
a producer cache configured to store the processed data generated by the producer;
a consumer comprising a second processing element configured to receive and process the processed data generated by the producer; and
a consumer cache configured to store the processed data generated by the consumer,
wherein the producer is configured to, in response to receiving a stash cache maintenance operation (stash-CMO), perform a direct cache transfer (DCT) to transfer the processed data from the producer cache to the consumer cache, wherein the stash CMO comprises at least one of: a flush type stash-CMO, a copy back type stash-CMO, or a first-stash-CMO transmitted from a software management unit to a home of the processed data.

* * * * *